April 26, 1960   J. C. WHITING   2,934,077
GRAVITY CONTROLLED OUTLET SELECTING VALVE
Filed Nov. 25, 1957   2 Sheets-Sheet 1

INVENTOR
JAMES CLIFFORD WHITING
BY Maybee & Legris
ATTORNEYS

April 26, 1960   J. C. WHITING   2,934,077
GRAVITY CONTROLLED OUTLET SELECTING VALVE
Filed Nov. 25, 1957   2 Sheets-Sheet 2
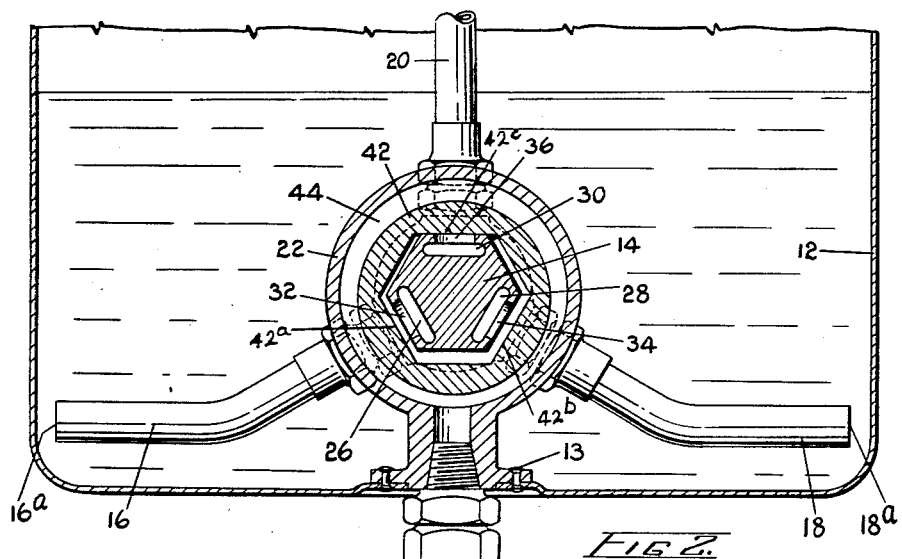
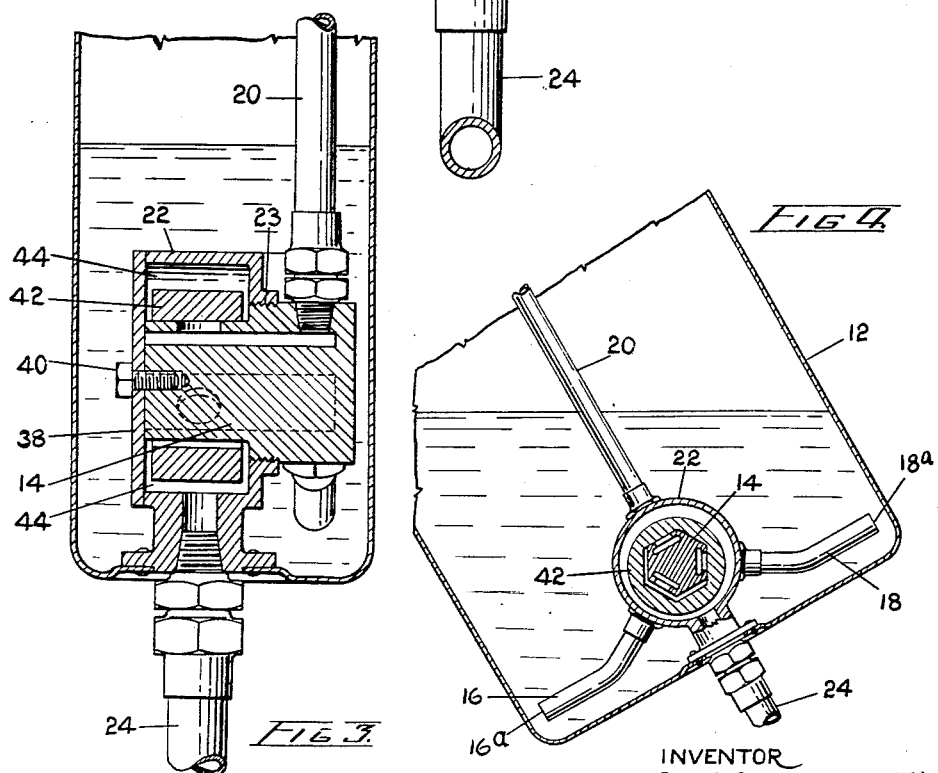
INVENTOR
JAMES CLIFFORD WHITING
BY
Maybee & Legris
ATTORNEYS

United States Patent Office 2,934,077
Patented Apr. 26, 1960

2,934,077

GRAVITY CONTROLLED OUTLET SELECTING VALVE

James Clifford Whiting, Downsview, Ontario, Canada, assignor to Orenda Engines Limited, Malton, Ontario, Canada, a corporation Application November 25, 1957, Serial No. 698,722

7 Claims. (Cl. 137—38)

This invention relates to a gravity controlled outlet selecting valve for use with a liquid-supplying tank that is tiltable and invertible.

The general object of this invention is to provide an improved outlet valve for a liquid-supply tank that may be tilted or turned over and that must still continuously supply liquid, and not air or a mixture of liquid and air, in any position with respect to the vertical. This kind of tank may be needed to deliver fuel or lubricating oil in aircraft.

A specific object of the invention is to provide a simple mechanical type of gravity-responsive regulation in valves for this kind of tank to ensure that the valves will tend to operate reliably under all conditions of operation.

These objects are attained by the embodiment of the invention disclosed in the following description and in the accompanying drawings, which are of a valve that is suitable for a lubricating oil supply tank for aircraft.

In the drawings—in which each reference character indicates the same part in all the views—

Fig. 2 is another fragmentary view showing the valve in vertical cross-section in the upright position of the tank;

Fig. 3 is another fragmentary view showing the valve in vertical axial section with the tank in the upright position; and Fig. 4 is another fragmentary view on a reduced scale, showing the tank in vertical cross-section (as it is shown in Fig. 2) but with the tank tilted downwardly toward one of its ends.

Figure 1:
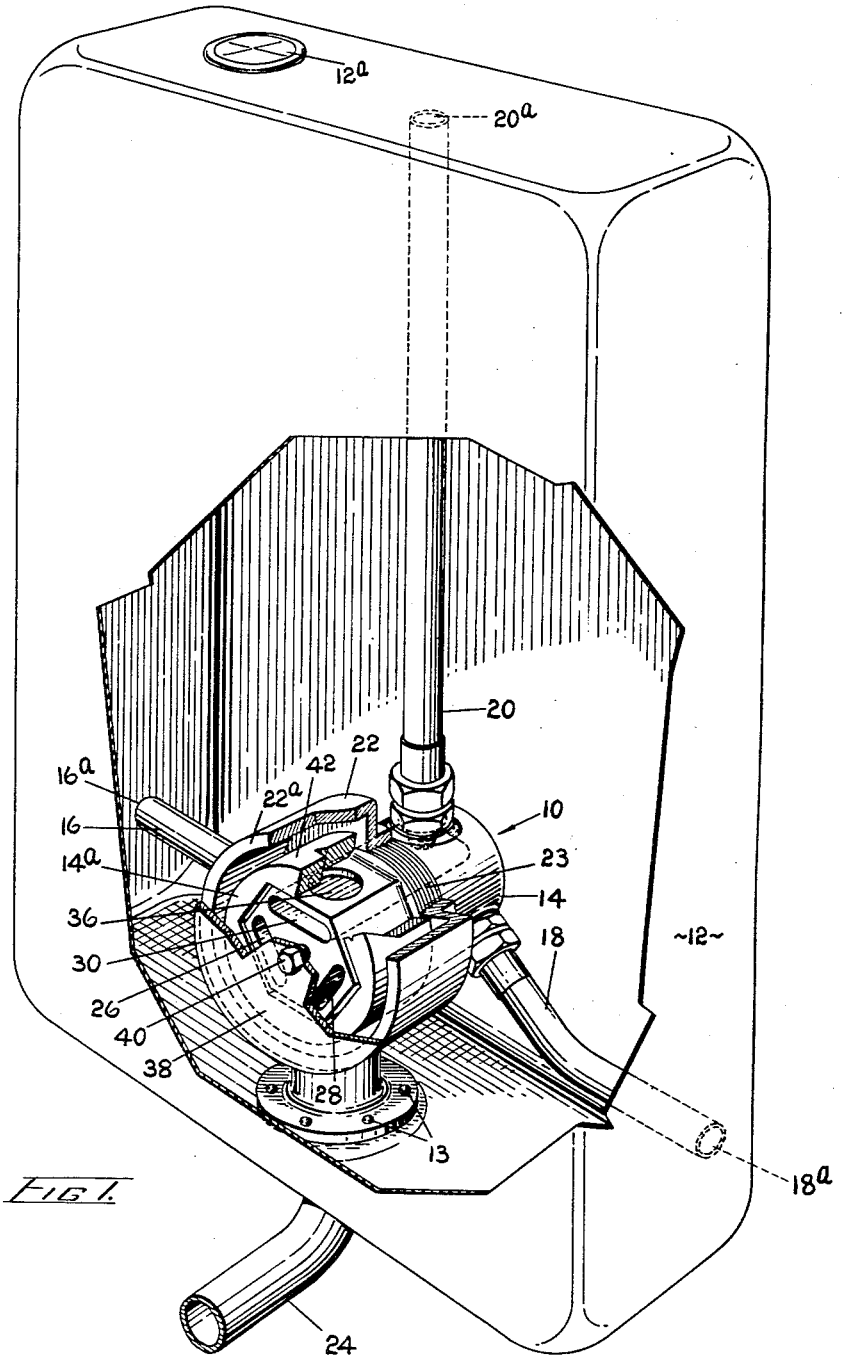
Figure 1 is a fragmentary perspective view of a valve according to the invention mounted in the bottom of an aircraft oil tank in upright position, the drawings showing some of the parts in section and part of the tank broken away.

The valve 10 according to the invention, is shown in the drawings mounted in an oil tank 12 having a filling cap 12a. The valve is rigidly secured to the tank 12, as by rivets 13, so that it will tilt with the tank. The valve includes an inner valve member 14 into which lead three individual outlet conduits—front conduit 16 with its open end 16a at the bottom and near the front end wall of the tank, rear conduit 18 with its open end 18a at the bottom and near the rear end wall of the tank, and top conduit 20 with its open end 20a near the top wall of the tank, near the center of the top wall of the tank. Surrounding the front part of the inner valve member 14 is a cylindrical housing 22, which is connected to the valve member 14 by a threaded connection 23. The valve itself provides regulated communication between one or two of the three individual outlet conduits and a common outlet conduit 24 leading out of the tank to conduct the liquid from the tank to the parts of the engine where it is to be used.

Inside the housing 22, the front part of the inner valve member 14 is of regular hexagonal cross-section and has a front face 14a in the same plane as the front edge 22a of the housing 22. The conduits 16, 18 and 20 lead into three equally spaced-apart passages 26, 28 and 30 extending from the front face 14a almost to the rear of the inner valve member 14. The top passage 30 communicates with the top conduit 20, and the other two passages 26 and 28 communicate with conduits 16 and 18 respectively. Each of these passages has a generally oval, flattened cross-section and each lies close to one of the six outer faces of the valve member 14, the passages lying adjacent to alternate faces of the valve member. Circular ports 32, 34 and 36 through the alternate hexagonal faces lead respectively into the passages 26, 28 and 30, each being located about midway of the hexagonal length of the valve member 14.

To close off the open ends of the passages 26, 28 and 30, a circular cover plate 38 fits over the open end of the housing 22 and lies against the front face 14a of the inner valve member. A bolt 40 secures it to the said front face.

A tubular valve regulating weight 42 surrounds the hexagonal part of the inner valve member 14 within the housing 22. The weight is generally cylindrical on the outside which is spaced from the inner surfaces of the housing 22, and the cross-section of the aperture in the weight is an irregular hexagon. The three faces 42a, 42b and 42c of the hexagon that face the apertured faces of the inner valve member 14, are slightly longer than the facing apertured sides of the hexagonal cross-section of the inner valve member 14, while the remaining three sides are the same length as or shorter than the facing sides of the valve member 14. Thus in any position of the valve, at least one and not more than two of the inner faces of the weight 42 will overlie apertured faces of the valve member 14. For instance, when the tank is upright as shown in Figs. 1 to 3, the face 42c of the weight will rest on the upper face of the inner valve member 14, where the port 36 leading into the passage 30 is located, and the port 36 and passage 30 will be closed, thereby closing off flow through top conduit 20, the end 20a of which will be open to the air in the upright position. This position of the weight is shown in Figs. 1 and 2.

Because the inner dimensions of the weight are greater than the outer dimensions of the inner valve member 14, in the upright position of the assembly, the faces 42a and 42b of the weight that are opposite to the faces having the ports 32 and 34 in the inner valve member 14 are spaced from these ports, and permit normal flow through individual outlet conduits 16 and 18, through passages 26 and 28, through ports 32 and 34 and through the space 44 between the weight 42 and housing 22, into the common outlet conduit 23. This is the only permissible flow in the upright position for the open ends 16a and 18a are the only individual conduit ends that are immersed in liquid in that position. A very slight relative movement of the weight 42 on the valve member 14 however, either forward or backward, will interrupt flow from one of these conduit ends, also.

The operation of the valve when the tank is tilted forward, as when the aircraft is diving, can be seen by referring to Fig. 4. In this position, the weight 42 has been moved forward by gravity but it still seals the port 36 leading into passage 30 and this closes off flow through top conduit 20. (In this position of the tank, the end 20a of the top conduit is still open to the air in the tank.) However, in this position the weight also seals off the port 34 leading into passage 28 in the inner valve member, and thus closes off flow to the individual outlet conduit 18, the end of which 18a will become open to the air in the tank with further tilting or emptying of the tank.

As the tank approaches an inverted position, the weight 42 will seal both ports 32 and 34 leading to passages 26 and 28, thus closing off flow through the individual conduits 26 and 28. However, port 36 leading into passage 30 will be opened, allowing flow to top conduit 20 through the open end 20a of this individual conduit, which will be immersed in the inverted position of the tank.

The reliable nature of the control provided by the simple sequence of movement of the weight 42 is apparent from the manner in which it operates.

It will be understood that the form of the invention herewith shown and described is a preferred example and various modifications can be carried out without departing from the spirit of the invention or the scope of the appended claims.

What I claim as my invention is:

1. A gravity-controlled outlet selecting valve in combination with a liquid-supply tank that is tiltable and invertible, comprising a housing connected to and tiltable with the tank, individual outlet conduits leading into the housing from open ends spaced in the tank whereby at least one of the open ends will be submerged in liquid in the tank in any position of the tank, an inner valve member within the housing and having a flat face for each of the individual outlet conduits, the valve member being fixed to and tiltable and invertible with the tank and the flat faces being arranged around the periphery of the valve member, a passage in the valve member for each of the individual outlet conduits, each passage communicating with a different outlet conduit, a port in each of said faces leading out of one of the passages, a tubular weight loosely and movably surrounding the faces of the valve member within and spaced from the housing and having inner faces each corresponding to a face of the valve member, one of the inner faces of the weight overlying one of said faces of the valve member in any position of the tank and closing the port in the said valve member face, whereby flow through the individual outlet conduit communicating with the closed port is prevented, at least one of said faces of the valve member being spaced from the corresponding inner face of the weight in any position of the tank whereby flow through the individual outlet conduit communicating with the open port in the last named valve member face can take place into the space between the weight and the housing, and a common outlet conduit leading out of the housing.

2. The combination claimed in claim 1, in which the inner valve member is hexagonal in cross-section and said ports are in alternate faces.

3. The combination claimed in claim 1, in which there are three individual outlet conduits, a front conduit with its open end at the bottom near the front wall of the tank, a rear conduit with its open end at the bottom and near the rear wall of the tank, and a top conduit with its open end near the top wall of the tank near the center of the top wall.

4. The combination claimed in claim 3, in which the flat face of the valve member which corresponds to the top outlet conduit is at the top of the valve member when the tank is in an upright position.

5. A gravity-controlled outlet selecting valve for use with a liquid-supply tank that is tiltable and invertible, comprising a housing, individual outlet conduits leading into the housing, an inner valve member within the housing and having a flat face for each of the individual outlet conduits, the flat faces being arranged around the periphery of the valve member, a passage in the valve member for each of the individual outlet conduits, each passage communicating with a different outlet conduit, a port in each of said faces leading out of one of the passages, a tubular weight loosely and movably surrounding the faces of the valve member within and spaced from the housing and having inner faces each corresponding to a face of the valve member, one of the inner faces of the weight overlying one of said faces of the valve member in any position of the valve and closing the port in the said valve member face, whereby flow through the individual outlet conduit communicating with the said closed port is prevented, at least one of said faces of the valve member being spaced from the corresponding inner face of the weight in any position of the valve whereby flow through the individual outlet conduit communicating with the open port in the last named valve member face can take place into the space between the weight and the housing, and a common outlet conduit leading out of the housing.

6. A gravity-controlled outlet selecting valve as claimed in claim 5, in which the inner valve member is hexagonal in cross-section and said ports are in alternate faces.

7. A gravity-controlled outlet selecting valve as claimed in claim 6, in which the inner valve member has a cross-section which is a regular hexagon and the inner faces of the tubular weight define a bore of irregular hexagonal cross-section, the inner faces of the weight which are opposite to the apertured faces of the valve member having a length greater than said apertured faces and the other inner faces of the weight having a length not greater than the length of the apertured faces of the valve member.

References Cited in the file of this patent
UNITED STATES PATENTS
2,747,593   Royer _____ May 29, 1956